United States Patent [19]
Wade

[11] Patent Number: 5,859,598
[45] Date of Patent: Jan. 12, 1999

[54] GEAR POSITION INDICATOR

[76] Inventor: William G. Wade, 2692 Town Farm Rd., Unity, Me. 04988

[21] Appl. No.: 533,708

[22] Filed: Sep. 26, 1995

[51] Int. Cl.$^6$ .................................................. G08B 21/00
[52] U.S. Cl. .......................................... 340/960; 340/945
[58] Field of Search ................................... 340/960, 959, 340/963, 945; 364/427; 73/767; 200/47, 49

[56] References Cited

U.S. PATENT DOCUMENTS

| | | | |
|---|---|---|---|
| 3,161,852 | 12/1964 | Timm | 340/960 |
| 3,815,262 | 6/1974 | Patterson et al. | 434/35 |
| 3,888,019 | 6/1975 | Trabanino | 434/35 |
| 4,491,824 | 1/1985 | Chiou | 340/467 |
| 5,139,115 | 8/1992 | Browne et al. | 340/463 |

FOREIGN PATENT DOCUMENTS

| | | | |
|---|---|---|---|
| 0470200 | 8/1937 | United Kingdom | 340/960 |
| 0487755 | 6/1938 | United Kingdom | 340/960 |

OTHER PUBLICATIONS

"Direct Current Autosyn Position Indicator" by Pioneer (Pioneer Wheel and Flap Position Indicator), 6 pages, Mar. 3, 1940.

Donald L. Gibson, "A Simple Wiring Circuit", Sport Aviation, p. 95, Aug., 1995.

Forrest M. Mims, III, "Getting Started in Electronics", 1983.

Williams Wade, "Landing Gear Indicator System", Hints for Homebuilders, p. 90, Mar., 1990.

*Primary Examiner*—Jeffery Hofsass
*Assistant Examiner*—Benjamin C. Lee
*Attorney, Agent, or Firm*—Choate, Hall & Stewart

[57] ABSTRACT

An apparatus for displaying state and transition information in a system. A sensor and display system is disclosed for displaying aircraft landing gear status. The system utilizes two light emitting diodes (LEDs) for each landing gear leg to display the current position of each gear leg. One yellow LED indicates gear UP and the second green LED shows gear DOWN position. When the control switch is moved to change the position of the gear, the indicator light which had been lit is extinguished, and the indicator for the desired position begins to flash, indicating gear movement. The indicator will continue to flash until the gear leg has reached the limit of travel, at which time the indicator stops flashing and glows steadily. Each gear leg indicator operates independently of the others, so that proper position of each gear leg can be confirmed and any malfunction can immediately be identified.

5 Claims, 5 Drawing Sheets

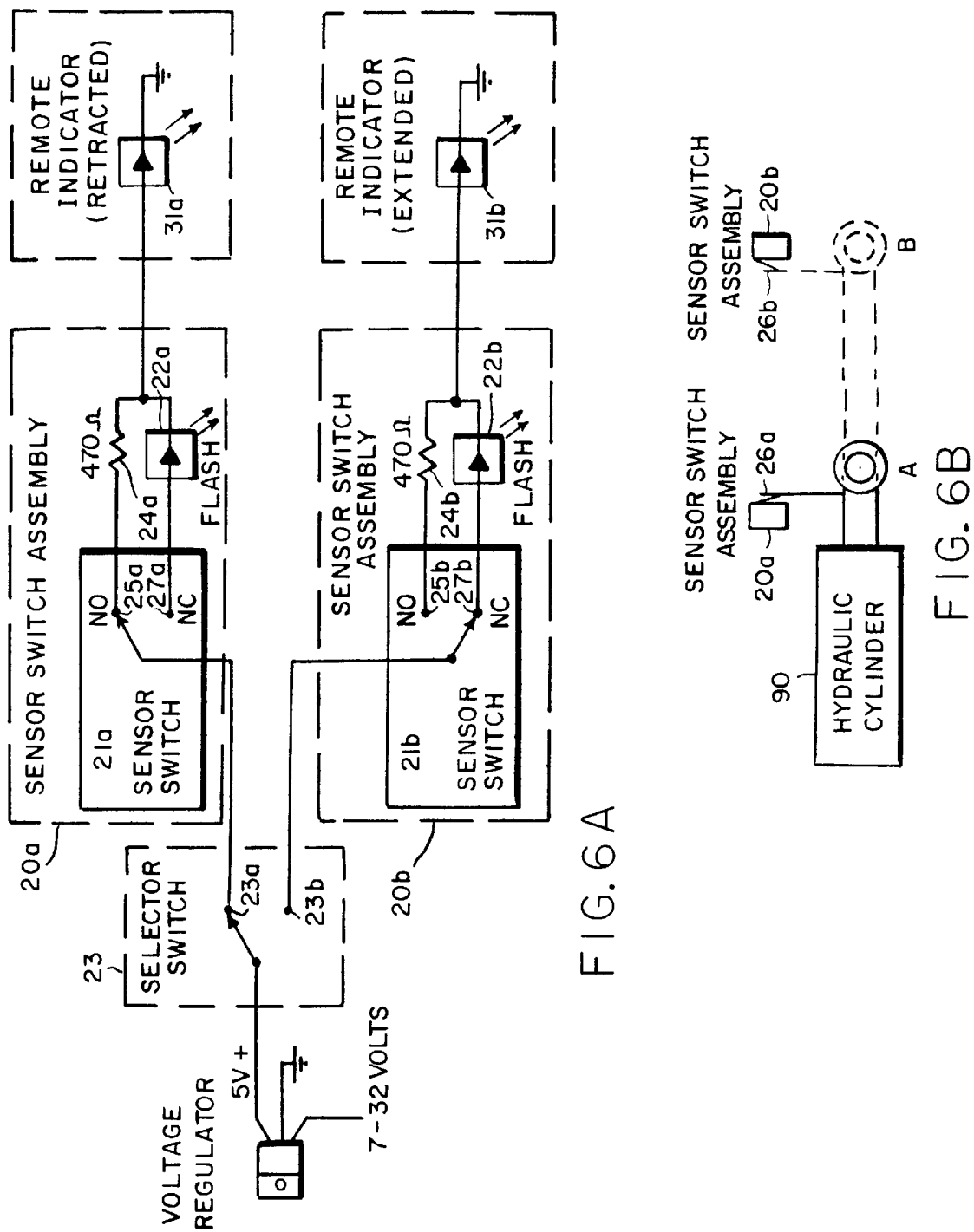

GEAR POSITION INDICATOR

FIELD OF THE INVENTION

This invention relates to the field of status indicators. More particularly, the invention relates to an apparatus for displaying the position of aircraft landing gear.

BACKGROUND OF THE INVENTION

Retractable landing gear used on an aircraft require an indicator to show the pilot that the gear are up or down, as the landing gear is normally out of view of the pilot sitting in the cockpit. It is very dangerous to land if one or more gear legs are partially extended, as collapse would almost certainly result. Conversely, if one or more gear were not fully retracted, drag and fuel consumption would be excessive and the aircraft structure could be overly stressed at high speed. Indicator systems currently in use have at most one light per landing gear which illuminates when the gear is fully down, and a warning light to show when there is a problem. Gear retraction is deduced by the position of the landing gear switch and by the extinguished indicator lights.

Accordingly, it is an object of the invention to provide additional gear status information.

A further object of the invention is to provide an indicator system which displays in transit (extension or retraction) information.

Another important object of the invention is to provide an indicator system which displays an indication that the gear have completed their travel to the required limits.

SUMMARY OF THE INVENTION

The present invention provides a lightweight, simple, and highly reliable means to show the position of each gear leg in one of four modes: fully down, retracting, fully up, and extending. It is also a more direct and intuitive display which requires less interpretation by the pilot. This can be an important safety factor given the work load which reaches a peak during takeoff and landing.

The display consists of light emitting diodes (LEDs) which correspond to the position of each individual gear leg. Each indicator LED has three states: off, flashing, and steadily on, which indicate specific states of the landing gear. Off indicates that the associated direction of travel has not been selected. On indicates that the associated direction of travel has been selected and the limit of travel has been reached. Flashing shows that a particular direction of travel has been selected but the limit of travel has not been reached. Each gear leg typically has one LED which is used to show the fully up position and another which shows the fully down position when steadily illuminated. The use of different LED colors are used to facilitate distinguishing between the landing gear positions. A yellow LED can be utilized to indicate that the landing gear is in a lock up state or position. A green LED can be utilized to indicate that the landing gear is in a locked down state or position. Only one of the two LEDs is illuminated for each gear leg at any time. When the gear is moving between the extended and retracted positions, the specific indicator will flash until the gear has reached its limit. If one gear does not reach its limit, it will continue to flash while the other indicators glow steadily. This immediately alerts the pilot that a malfunction has occurred, and identifies which gear leg is affected.

BRIEF DESCRIPTION OF THE DRAWINGS

The invention will be better understood if reference is made to the accompanying drawings.

FIG. 6A is a schematic diagram of an embodiment of the present invention.

FIG. 6B illustrates a system utilizing the embodiment diagrammed in FIG. 6A.

DETAILED DESCRIPTION

Figure 1:
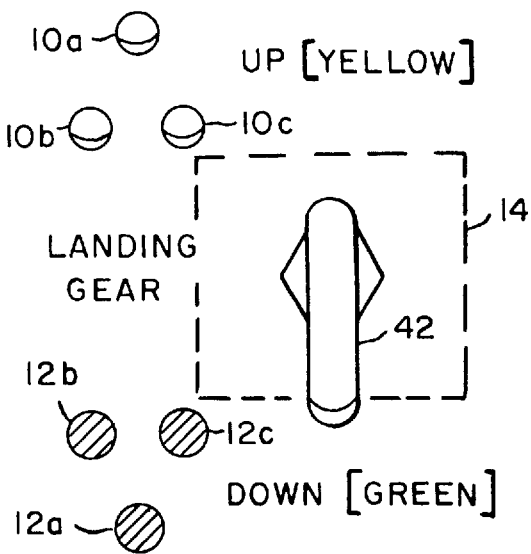
FIG. 1 illustrates the display of the present invention.

FIG. 1 illustrates a display of the invention. Three LEDs 10a, 10b and 10c, one per landing gear element and placed in a configuration to mimic the gear placement on the plane, are used to indicate the "up status" of the gear and are typically a different color as compared to LEDs 12a, 12b and 12c. In the preferred embodiment LEDs 10a, 10b and 10c are yellow in color. Each LED 10a, 10b and 10c can adopt three states, steady emit (on), intermittent emit (blink), or no emit (off), in indicating the "up status." The on state indicates that the gear are fully up. The off state indicates that the up direction is not selected. The blink state indicates that the gear are in transit to fully up.

In addition, three LEDs 12a, 12b and 12c, one per landing gear element and placed in a configuration to mimic the gear placement on the plane, are used to indicate the "down status" of the gear. In the preferred embodiment, LEDs 12a, 12b and 12c are green in color. Each LED 12a, 12b and 12c can adopt three states, steady emit (on), intermittent emit (blink), or no emit (off), in indicating the "down status." The on state indicates that the gear are fully down. The off state indicates that the down direction is not selected. The blink state indicates that the gear are in transit to fully down.

Each landing gear element has a pair of corresponding LEDs, such as the LTL-327G and LTL-327Y sold by Lite-on Inc., located at 720 S. Hillview Dr., Milpitas, Calif. 95035. In the embodiment illustrated by FIG. 1 for a three element landing gear system, LEDs are paired 10a with 12a, 10b with 12b, and 10c with 12c to convey the status of each particular landing gear element. A "conventional" aircraft (taildragger) would normally require sensors and indicators for the two main gear only, and so would have four indicator LEDs for this embodiment of the invention. Switch 14 is utilized to switch the landing gear directions.

Figure 2:
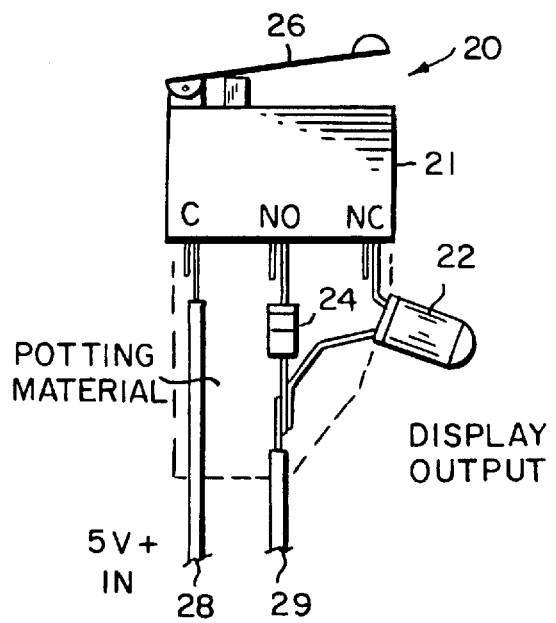
FIG. 2 illustrates an embodiment for a position sensor of the present invention.

FIG. 2 illustrates an embodiment for a sensing element 20 of the invention. Switch 21, having an actuator arm 26, is connected to the display system through leads 28 and 29. Lead 28 supplies the power to the common contact of switch 21. Normally open contact of switch 21 is connected to resistor 24, with normally closed contact of switch 21 connected to flashing LED 22. Flashing LED 22 and resistor 24 are then connected in common to lead 29, which is connected to an LED in the display. When actuator arm 26 of switch 21 is not in the actuated position, switch 21 connects power lead 28 to flashing LED 22. This results in the presence of intermittent power on lead 29, thereby blinking the display LED. When actuator arm 26 is in the actuated position, such as when the landing gear element has reached the end of its travel, switch 21 connects lead 28 to resistor 24. This results in the presence of steady power on lead 29, thereby causing the display LED to be steadily illuminated. The complete assembly can be encapsulated in a potting compound such as epoxy mixed with milled glass fiber in order to reduce mechanical stress and corrosion.

Figure 3:
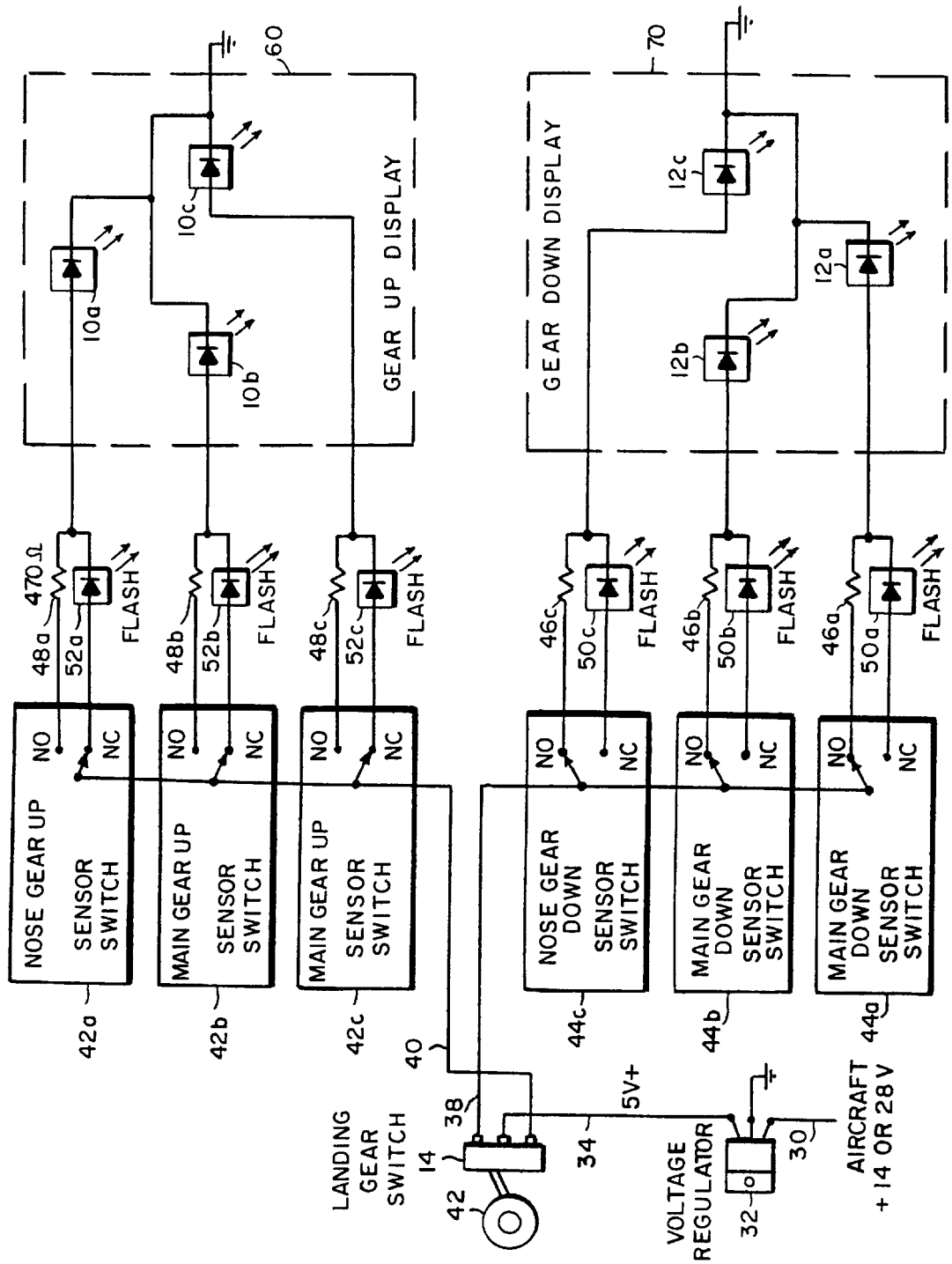
FIG. 3 is a schematic diagram of an embodiment of the present invention.

A schematic for an embodiment of the system is illustrated in FIG. 3. Aircraft bus voltage 30, nominally 14 or 28 volts, is applied to a voltage regulator 32, such as the Panasonic AN7805 model, which steps the voltage down to 5 volts positive 34. (The Panasonic model is manufactured by the parent company of Panasonic, Matsushita Services Co., which is located at 50 Meadowland Parkway, Secaucus, N.J. 07094). This simultaneously puts the voltage at the level needed for the circuit and protects the circuit from the influence of bus voltage fluctuations. The 5 volt power 34 is connected to a center pole on a landing gear switch 14, in parallel to the connections for the landing gear actuators. Power is supplied to or cut off from either half of the display as the lever 42 is moved to commence gear retraction or extension by making connections to 38 and 40. As shown in FIG. 3, the gear up display 60 has no power and is unlit while the gear down display 70 has voltage and is illuminated.

Current flows from switch 14 to each sensor switch 44a, 44b and 44c, such as the DC2C-A1RB manufactured by Cherry Electrical Products, located at 3600 Sunset Ave., Waukegan, Ill. 60087-3298. In the present example, the power is switched to 470-ohm resistors 46a, 46b and 46c in order to reduce voltage to the operating range of the indicator LEDs 12a, 12b and 12c, and to adjust the brightness of its output. The value of resistors 46a, 46b and 46c may be varied to suit the particular LEDs 12a, 12b and 12c (here illustrated as LTL-327G LEDs) utilized in the display 70. Different cockpit layouts may also require a different level of illumination, as the display must be bright enough to see in daytime, yet not bright enough to be distracting or to mask other displays at night.

If the gear is to be retracted, moving lever 42 on switch 14 extinguishes the gear down display 70. Current 40 flows to the gear up sensor switches 42a, 42b and 42c which are initially in the normally closed (NC) position. This causes power to be applied to the flashing LEDs 52a, 52b and 52c, such as the LTL-4213-FL sold by Lite-on Inc. Each time an LED 52a, 52b or 52c flashes, a pulse of current flows to the corresponding connected indicator LED 10a, 10b and 10c, (here illustrated as LTL-327Y LEDs) causing it to flash sympathetically. When each gear reaches the limit of travel, the arm on the corresponding sensor switch 42a, 42b and 42c is depressed by contact with the gear leg or a moving portion of the retraction linkage. This opens the NC contacts and closes the normally open (NO) contacts, which removes power from the flashing LED 52a, 52b or 52c and applies power to corresponding resistor 48a, 48b or 48c thereby eliminating the pulses and providing a steady current to illuminate the corresponding indicator 10a, 10b or 10c. If any individual gear leg fails to reach its limit and trip its sensor, the associated LED 10a, 10b or 10c will continue to flash and that portion of the display will flash as well; indicating that the gear element, in this case, is not yet fully up. If the display continued to flash for an unusually long time, the pilot would become alerted that something was wrong.

Figure 4:
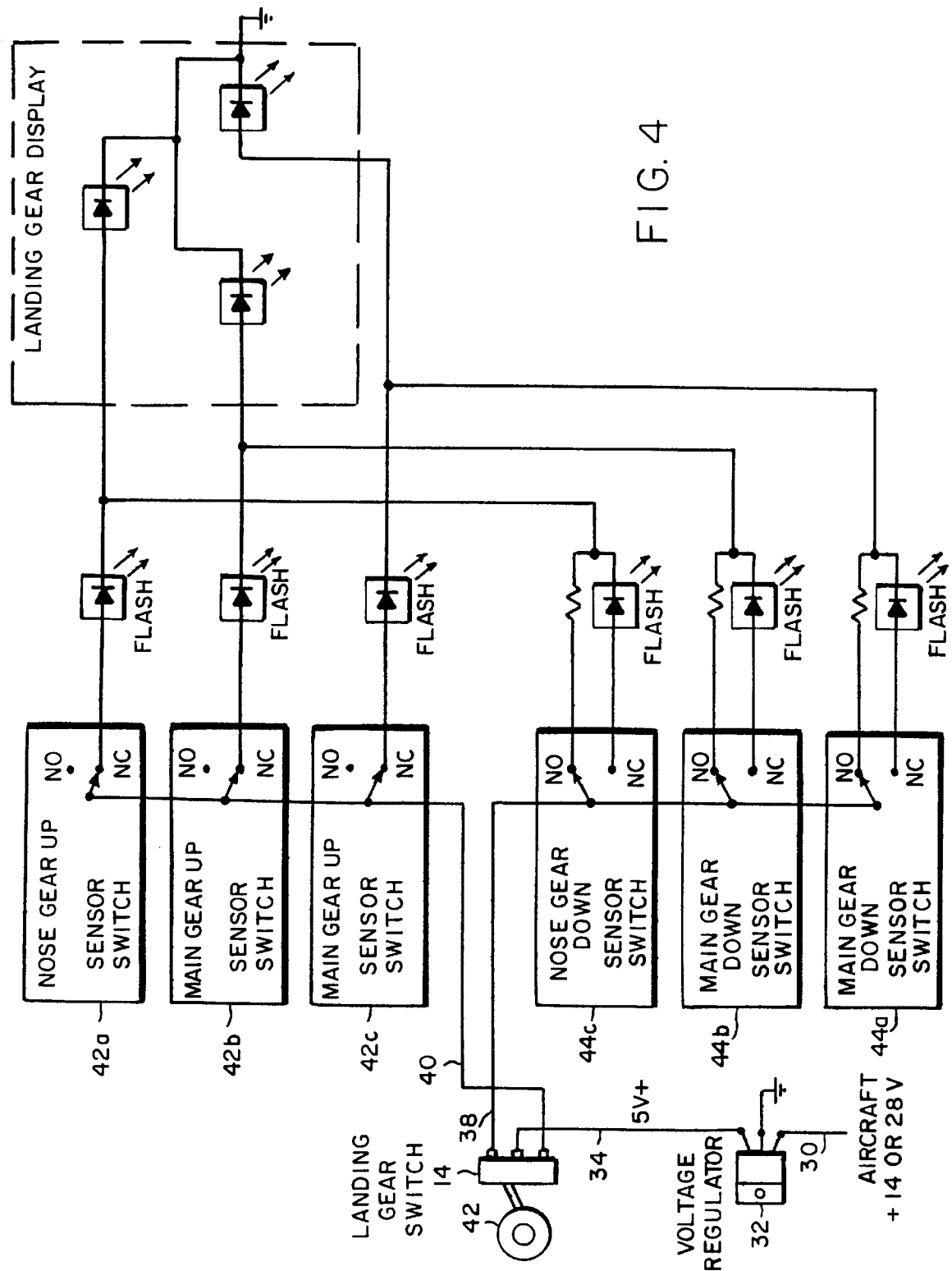
FIG. 4 is a schematic diagram of an embodiment of the present invention.

The system described may also be employed for a conventional two- or three-light display by eliminating one half of the display, as shown in FIG. 4. The resistor would be removed from the gear UP sensor switches, and the NC contact would be unused. Output from the gear UP flashing LED would be connected to the corresponding gear DOWN display LED. The result would be that the display would operate as previously described in the extending and DOWN position. However, when the gear was retracted the indicator lights would flash until each gear reached its limit, at which time the indicator would be extinguished. This would provide the same warning as the full four- or six-LED display, and might be more suitable for retrofitting existing installations. The preferred color for the LEDs in such a display would be green.

Figure 5:
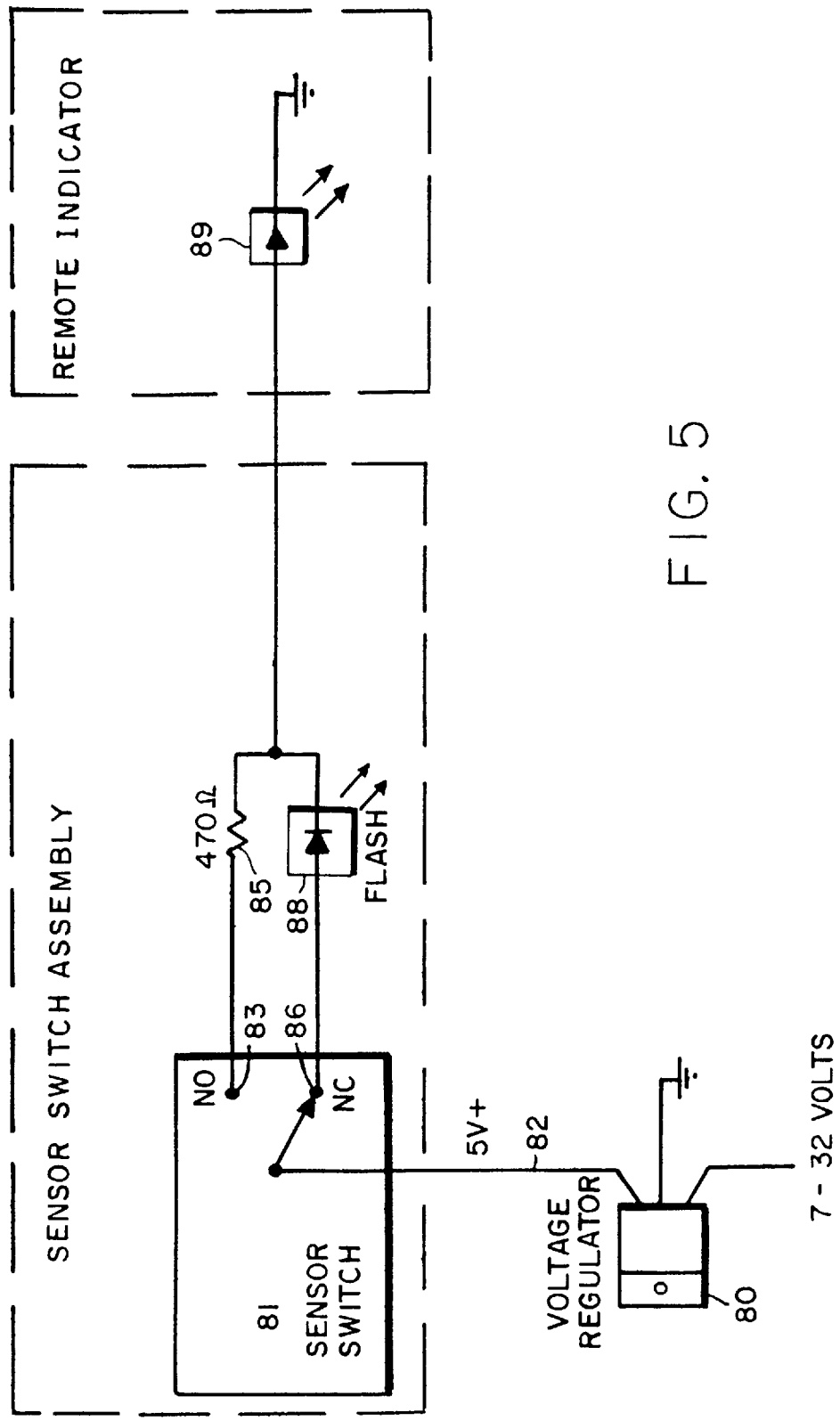
FIG. 5 illustrates an embodiment of a position sensor of the present invention.

FIG. 5 illustrates an embodiment of a position sensor of the present invention. Current flows from power source 80 to sensor switch 81 via a common pole 82. Normally open contact 83 of switch 81 is connected to current limiting means 85, with normally closed contact 86 of switch 81 connected to current interrupting means 88. Current limiting means 85 and current interrupting means 88 are then connected in common to display indicating means 89.

When sensor switch 81 is connected to normally open contact 83, current flows to current limiting means 85. This results in the presence of steady power on display indicating means 89, thereby causing the display to be steadily illuminated.

When sensor switch 81 is connected to normally closed contact 86, current flows to current interrupting means 88. This results in the presence of intermittent power on display indicating means 89, thereby blinking the display indicating means 89.

FIG. 6A is a schematic diagram of an embodiment of the present invention, wherein the status of travel for only one object is indicated. Selector switch 23 has a top pole 23a and a bottom pole 23b, though which current flows. Connection to top pole 23a allows current to flow to sensor switch 21a and connection to the bottom pole 23b allows current to flow to sensor switch 21b.

Actuator arm 26a actuates connection of sensor switch 21a to either the normally open contact 25a or the normally closed contact 27a. When sensor switch 21a is connected to normally open contact 25a, current flows to resistor 24a. This results in the presence of steady power, thereby causing the display LED 31a to be steadily illuminated. When sensor switch 21a is connected to normally closed contact 27a, current flows to flashing LED 22a. This results in the presence of intermittent power, thereby blinking the display LED 31a.

Actuator arm 26b actuates connection of sensor switch 21b to either the normally open contact 25b or the normally closed contact 27b. When sensor switch 21b is connected to normally open contact 25b, current flows to resistor 24b. This results in the presence of steady power, thereby causing the display LED 31b to be steadily illuminated. When sensor switch 21b is connected to normally closed contact 27b, current flows to flashing LED 22b. This results in the presence of intermittent power, thereby blinking the display LED 31b.

FIG. 6B illustrates a system utilizing the embodiment diagrammed in FIG. 6A. When selector switch 23 connects to top pole 23a, power is supplied to sensor switch assembly 20a and power is cut off from sensor switch assembly 20b. When selector switch 23 connects to bottom pole 23b, power is supplied to sensor switch assembly 20b and power is cut off from sensor switch assembly 20a.

Sensor switch assemblies 20a and 20b, both having actuator arms 26a and 26b, respectively, are connected to hydraulic cylinder 90 at points A and B, respectively. When actuator arm 26a is depressed, sensor switch 21a connects to normally open contact 25a, thereby connecting power to resistor 24a. This results in the presence of steady power, thereby causing the display LED 31*a* to be steadily illuminated. When actuator arm 26*a* is not depressed, sensor switch 21*a* connects to normally closed contact 27*a*, thereby connecting power to flashing LED 22*a*. This results in the presence of intermittent power, thereby blinking the display LED 31*a*.

When actuator arm 26*b* is depressed, sensor switch 21*b* connects to normally open contact 25*b*, thereby connecting power to resistor 24*b*. This results in the presence of steady power, thereby causing display LED 31*b* to be steadily illuminated. When actuator arm 26*b* is not depressed, sensor switch 21*b* connects to normally closed contact 27*b*, thereby connecting power to flashing LED 22*b*. This results in the presence of intermittent power, thereby blinking the display LED 31*b*.

When hydraulic cylinder 90 is located at point A, hydraulic cylinder 90 depresses actuator arm 26*a*, causing sensor switch 21*a* to connect to normally open contact 25*a*. When hydraulic cylinder 90 is not at point A, such as when it is in transit or when it is at point B, actuator arm 26*a* is not depressed and sensor switch 21*a* connects to normally closed contact 27*a*.

When hydraulic cylinder 90 is located at point B, hydraulic cylinder 90 depresses actuator arm 26*b*, causing sensor switch 21*b* to connect to normally open contact 25*b*. When hydraulic cylinder 90 is not at point B, such as when it is in transit or when it is at point A, actuator arm 26*b* is not depressed and sensor switch 21*b* connects to the normally closed contact 27*b*.

Thus, the position of an object is selected by setting selector switch 23 so that it connects to either the top pole 23*a* or the bottom pole 23*b*, depending upon the desired position of the object. Movement of selector switch 23, for example, from top pole 23*a* to bottom pole 23*b* causes power to be cut off from sensor switch assembly 20*a*, thereby extinguishing illumination of display LED 31*a*, and to be supplied to sensor switch assembly 20*b*, thereby activating illumination of display LED 31*b*. Display LED 31*b* flashes, as long as hydraulic cylinder 90 is still located at point A or is in transit, because sensor switch 21*b* remains connected to normally closed contact 27*b*. As soon as hydraulic cylinder 90 reaches point B, hydraulic cylinder 90 depresses actuator arm 26*b*. This causes sensor switch 21*b* to connect to normally open contact 25*b*, thereby supplying power to resistor 24*b* and resulting in steady illumination of display LED 31*b*. The presence of steady illumination confirms that the object has fully reached the desired position. The presence of flashing illumination indicates that the object has not reached the desired position, i.e., the object could still be at the former position or it could be in transit.

The invention is not limited to the examples described and shown. Various modifications may be made to the examples by one skilled in the art without departing from the scope of the invention.

What is claimed is:

1. An aircraft indicator system for displaying a fully retracted state, a retraction transition state, a fully extended state, and an extension transition state of landing gear having a plurality of legs comprising:

a power supply having a source connection and a return connection;

a landing gear switch in communication with said source connection adapted to route power alternatively from said power supply to an up connection and a down connection, said up connection corresponding to a retracted state of said landing gear, and said down connection corresponding to an extended state of said landing gear;

an up and a down sensor assembly, each sensor assembly comprising, a sensor switch activated by said landing gear having a common pole, a normally closed pole and a normally open pole;

a resistor having a first end and a second end, said first end connected to said normally open pole;

a flashing diode having a first end and a second end, said diode first end connected to said normally closed pole, said diode second end connected to said resistor second end; and a LED having a first end and a second end, said LED first end connected to said resistor second end, said LED second end connected to said power supply return connection, whereby said sensor switch causes said LED to indicate intermittently when said sensor switch actuates the normally closed pole, and said sensor switch causes said LED to indicate steadily when said sensor switch actuates the normally open pole;

said common pole of said up sensor assembly connected to said up connection of said landing gear switch, and said common pole of said down sensor assembly connected to said down connection of said landing gear switch;

whereby said LED of said down sensor assembly indicates steadily when said landing gear is in said fully extended state and indicates intermittently when said landing gear is in said extension transition state; and whereby said LED of said up sensor assembly indicates steadily when said landing gear is in said fully retracted state and indicates intermittently when said landing gear is in said retraction transition state.

2. The aircraft indicator system of claim 1 further comprising three pairs of said up and said down sensor assemblies, each pair corresponding to each of three landing gear legs whereby said states of each of said legs are independently indicated.

3. The aircraft indicator system of claim 2 further comprising a display panel upon which said landing gear switch is mounted and upon which said LEDs of said three pairs of sensor assemblies are also mounted, said LEDs positioned proximately and correspondingly to an up and a down position of said landing gear switch.

4. The aircraft indicator system of claim 3 wherein said three LEDs of said up sensor assemblies form a triangle above said up position of said landing gear switch on said display panel, and said three LEDs of said down sensor assemblies form a triangle below said down position of said landing gear switch.

5. The aircraft indicator system of claim 4 wherein said LEDs of each of said pairs of sensors are vertically aligned on said display panel.

* * * * *